(12) United States Patent
Carpentier et al.

(10) Patent No.: US 8,436,133 B2
(45) Date of Patent: May 7, 2013

(54) GROUP 3 POST-METALLOCENE COMPLEXES BASED ON BIS(NAPHTHOXY)PYRIDINE AND BIS(NAPHTHOXY)THIOPHENE LIGANDS FOR THE RING-OPENING POLYMERISATION OF POLAR CYCLIC MONOMERS

(75) Inventors: Jean-François Carpentier, Acigne (FR); Evgueni Kirillov, Rennes (FR); Abbas Razavi, Mons (BE)

(73) Assignees: Total Petrochemicals Research Feluy, Seneffe (Feluy) (BE); Centre National de la Recherche Scientifique (CNRS), Paris (FR)

( * ) Notice: Subject to any disclaimer, the term of this patent is extended or adjusted under 35 U.S.C. 154(b) by 226 days.

(21) Appl. No.: 12/919,256

(22) PCT Filed: Feb. 17, 2009

(86) PCT No.: PCT/EP2009/051869
§ 371 (c)(1),
(2), (4) Date: Jan. 21, 2011

(87) PCT Pub. No.: WO2009/106459
PCT Pub. Date: Sep. 3, 2009

(65) Prior Publication Data
US 2011/0112273 A1 May 12, 2011

(30) Foreign Application Priority Data
Feb. 25, 2008 (EP) ..................................... 08290186

(51) Int. Cl.
*C08G 63/08* (2006.01)
*C08G 63/84* (2006.01)
*C08F 4/52* (2006.01)

(52) U.S. Cl.
USPC ........... 528/357; 528/359; 528/371; 528/409; 528/416; 534/15; 546/2; 546/6; 546/10; 502/150; 502/152; 502/155; 502/158; 502/167; 502/168

(58) Field of Classification Search .................... 534/15; 546/2, 6, 10; 502/150, 152, 155, 158, 167, 502/168
See application file for complete search history.

(56) References Cited

U.S. PATENT DOCUMENTS
2003/0191015 A1 * 10/2003 Chan et al. .................... 502/150

OTHER PUBLICATIONS

Yu et al (Catalysts for the ring-opening polymerization of ε-caprolactone and L-lactide and the mechanistic study, Polymer, 46 (2005) 5909-5917).*

* cited by examiner

*Primary Examiner* — Randy Gulakowski
*Assistant Examiner* — Rachel Kahn (57) ABSTRACT

The present invention relates to the use of group 3 post-metallocene complexes based on sterically encumbered bis(naphthoxy)pyridine and bis(naphthoxy)thiophene ligands in the ring-opening polymerisation of polar monomers such as, for examples, lactones, lactides, cyclic carbonates.

7 Claims, 7 Drawing Sheets

GROUP 3 POST-METALLOCENE COMPLEXES BASED ON BIS(NAPHTHOXY)PYRIDINE AND BIS(NAPHTHOXY)THIOPHENE LIGANDS FOR THE RING-OPENING POLYMERISATION OF POLAR CYCLIC MONOMERS

CROSS-REFERENCE TO RELATED APPLICATIONS

This application claims the benefit of PCT/EP2009/051869, filed Feb. 17, 2009, which claims priority from EP 08290186.9, filed Feb. 25, 2008.

The present invention relates to the use of group 3 post-metallocene complexes based on sterically encumbered bis(naphthoxy)pyridine and bis(naphthoxy)thiophene ligands in the ring-opening polymerisation of polar cyclic monomers such as, for examples, lactones, lactides, and cyclic carbonates.

Several methods have been developed to prepare polyesters and polycarbonates. The best method consists in the ring-opening polymerisation (ROP) of a cyclic monomer, selected either from a 4- to 6-membered lactone, lactide or cyclic carbonate monomer. These ROP reactions are usually carried out in the presence of an organometallic catalyst, which allows access to polymers with high activity, controlled molar mass, molar mass distribution and especially to polymers with controlled stereochemistry.

There is an abundant literature describing the synthesis of polyesters and polycarbonates by the ROP of 4- to 6-membered lactone, lactide or carbonate monomer, in the presence of organometallic catalysts, as reviewed for example in Dechy-Cabaret et al. (O. Dechy-Cabaret, B. Martin-Vaca, D. Bourissou Chem. Rev. 2004, 104, 6147-6176), in O'Keefe et al. (B. J. O'Keefe, M. A. Hillmyer, W. B. Tolman J. Chem. Soc. Dalton Trans. 2001, 2215-2224) and in Wu et al. (J. Wu, T.-L Yu, C.-T. Chen, C.-C. Lin Coord. Chem. Rev. 2006, 250, 602-626).

Most useful organometallic catalyst are currently based on metals such as magnesium, calcium, iron, zinc or group 3 (including the lanthanide series) elements, as described for instance in M. Okada (M. Okada, Prog. Poly. Sci. 2002, 27, 87-133), in H. Yasuda (H. Yasuda, J. Organomet. Chem. 2002, 647, 128-138), in Kerton et al. (F. M. Kerton, A. C. Whitwood, C. E. Williams, Dalton Trans. 2004, 2237-2244). in Hou and Wakatsuki (Z. Hou, Y. Wakatsuki, Coord. Chem. Rev. 2002, 231, 1-22), and in Agarwal et al. (S. Agarwal, C. Mast, K. Dehnicke, A. Greiner, Macromol. Rapid Commun. 2000, 21, 195-212).

There is a need to develop new catalyst systems for the ring-opening polymerisation of polar monomers such as lactones, lactides and cyclic carbonates.

It is an aim of the present invention to provide a method for polymerising such cyclic monomers with a post-metallocene catalyst system based on yttrium, lanthanum or a metal of the lanthanide series.

It is another aim of the present invention to use the post-metallocene catalyst system in combination with a transfer agent.

It is yet another aim of the present invention to use the post-metallocene catalyst component without activating agent.

It is a further aim of the present invention to control the characteristics and properties of the resulting polyesters, polylactides and polycarbonates.

In particular, it is another aim to prepare functionalised polymers selectively end-capped by a group originating from the transfer agent.

It is yet another aim of the present invention to apply the method to the immortal ring-opening polymerisation of lactides and new cyclic carbonates derived from glycerol.

Any one of those aims is, at least partially, fulfilled by the present invention.

Accordingly, the present invention discloses a process for preparing homo- or co-polymers of carbonates by ring-opening polymerisation of polar cyclic monomers with a metallic complex of formula I wherein $R^1$, $R^3$, $R^4$, $R^5$, $R^6$ and $R^7$ are each independently selected from hydrogen, unsubstituted or substituted hydrocarbyl, or inert functional group, wherein two or more of said groups can be linked together to form one or more rings, wherein Z' is one or two heteroatom(s) and n is 0 (Z'=O, S, N=N) or 1 (Z'=N), wherein Z is an atom selected from group 14 of the Periodic Table, wherein $R^2$ is a substituted or unsubstituted aryl group having at most 8 carbon atoms, and/or an alkyl group, with the restriction that $Z(R^2)_3$ is a bulky group, at least as bulky as tertio-butyl.

$Z(R^2)_3$ can also be a substituted aryl group, wherein M is a metal Group 3 of the periodic Table or a member of the lanthanide series, wherein $R^\$$ is alkyl, $CH_2SiMe_3$, $CH(SiMe_3)_2$, or OR* wherein R* is alkyl, aryl or lactate O—CH(CH3)(COOR'), or NR2 wherein R is SiMe$_3$ or SiHMe$_2$.

By inert functional group, is meant a group, other than hydrocarbyl or substituted hydrocarbyl, that is inert under the complexation conditions to which the compound containing said group is subjected. They can be selected for example from halo, ester, ether, amino, imino, nitro, cyano, carboxyl, phosphate, phosphonite, phosphine, phosphinite, thioether and amide. Preferably, they are selected from halo, such as chloro, bromo, fluoro and iodo, or ether of formula —OR* wherein R* is unsubstituted or substituted hydrocarbyl. After metallation of the ligand, an inert functional group must not coordinate to the metal more strongly than the groups organised to coordinate to the metal and thereby displace the desired coordinating group.

Preferably $R^S$ is $N(SiHMe_2)_2$, $N(SiMe_3)_2$ or OiPr.

Preferably $R^1$, $R^3$, $R^4$, $R^5$, $R^6$ and $R^7$ are each independently selected from hydrogen or alkyl groups having at most 6 carbon atoms, more preferably they all are hydrogen.

Preferably Z' is S or N.

Preferably, Z is C or Si more preferably, it is Si.

Preferably $R^2$ is a substituted or unsubstituted phenyl group, or a higher aromatic group (e.g. naphthyl), or an alkyl. More preferably, it is an unsubstituted phenyl group or a tertio-butyl group.

By inert functional group, is meant a group, other than hydrocarbyl or substituted hydrocarbyl, that is inert under the complexation conditions to which the compound containing said group is subjected. They can be selected for example from halo, ester, ether, amino, imino, nitro, cyano, carboxyl, phosphate, phosphonite, phosphine, phosphinite, thioether and amide. Preferably, they are selected from halo, such as chloro, bromo, fluoro and iodo, or ether of formula —OR* wherein R* is unsubstituted or substituted hydrocarbyl. After metallation of the ligand, an inert functional group must not coordinate to the metal more strongly than the groups organised to coordinate to the metal and thereby displace the desired coordinating group.

The metal complex of formula I results from the complexation reaction of metallic salt $MR^S_n$ with pro-ligand II in a solvent (II)

The Group 3 metal and lanthanide complexes are used in the ring-opening polymerisation.

An alcohol can optionally be added to the polymerisation medium as a transfer agent. The alcohol can be represented by formula R'OH wherein R' is an hydrocarbyl, linear or branched, having from 1 to 20 carbon atoms. Preferably R' is a secondary alkyl residue or benzylic group, more preferably it is isopropyl (iPr) or benzyl (Bn).

In the present polymerisation scheme, alcohol acts as a reversible transfer agent. it is observed that as the ratio alcohol/metal increases, the molecular weight of the polymer chains decreases to the same extent.

At a constant alcohol/metal ratio, the molecular weight of the polyester, polylactide or polycarbonate also depends upon the nature of the alcohol.

Optionally, the alcohol can contain a functional group which will be selectively capped at the terminus of each polyester, polylactide or polycarbonate chain. This functional group can be used for various purposes. As non-limiting examples, one can cite:

a) vinyl end-groups which can promote further copolymerisation with other monomers;

b) nitroxide or alkoxyamine end-groups which can promote controlled radical polymerisation and/or ring-opening polymerisation-s, c) fluorinated pony-tails.

Polymerisation can be carried out in bulk (liquid or in melt) or in solution. Usual aromatic and aliphatic hydrocarbons can be used for that purpose.

Polymerisation is conducted at a temperature ranging from 20° C. to 180° C., preferably between 50 and 150° C. The pressure ranges from 0.5 to 20 atm, preferably it is 1 atm.

The polymers thus prepared show typically a unimodal molecular weight distribution that ranges from 1.1 to 5.0, more typically from 1.5 to 2.5.

The number average molecular weight Mn can be tuned by the monomer-to-alcohol ratio and ranges from 1 000 to 1 000 000 g/mol, more typically from 10 000 to 250 000 g/mol.

This polymerisation process is operative for 5- to 7-membered cyclic carbonates, 4- to 7-membered lactones, 6-membered lactides or combinations thereof.

Among the preferred monomers of the present invention, one can cite: lactide (all stereoisomers or mixtures of those), beta-butyrolactone, trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH).

In particular, one can cite new cyclic carbonates such as 2-oxy-trimethylenecarbonate (OTMC), and dehydrotrimethylenecarbonate (DHTMC).

Copolymers resulting from any combinations of these monomers are also included in the present invention.

EXAMPLES

Preparation of {ONO}B(OH)

A. Preparation of (3-methoxy-2naphtyl) (triphenyl) silane

A solution of 15.3 mL of sec-BuLi 1.3 M in hexane/cyclohexane (19.91 mmol) was added dropwise to a stirred solution of 3.0 g of 2-methoxynaphthalene (18.96 mmol) in 70 mL of tetrahydrofuran (THF) at a temperature of −30° C. and for a period of time of 15 min. After stirring overnight at room temperature, to the resultant tinted solution was added a solution of 5.87 g of $Ph_3SiCl$ (19.91 mmol) and 3.46 mL of hexamethylphosphoramide (HMPA) (19.88 mmol) in 50 mL of THF. The reaction mixture was heated at reflux for a period of time of 20 h, cooled and diluted with 500 mL of water. The organic part was extracted with 3 times 50 mL of $Et_2O$. The combined organic extracts were dried over $MgSO_4$, and evaporated. The crude residue was recrystallised from heptane and dried under vacuum to give 7.11 g of (3-methoxy-2-naphthyl)(triphenyl)silane (17.07 mmol) with a yield of 90%.

The NMR spectrum was as follows: $^1H$ NMR (200 MHz, $CDCl_3$, 25° C.): δ 7.80 (m, 2H), 7.67 (m, 7H), 7.55-7.23 (m, 12H), 3.69 (s, 3H, $OCH_3$).

Anal. calcd. for $C_{29}H_{24}OSi$: C, 83.61; H, 5.81. Found: C, 82.15; H, 5.23.

B. Preparation of (4-bromo-3-methoxy-2naphtyl) (triphenyl) silane

A 150 mL Schlenk flask was charged with 4.68 g of (3-methoxy-2-naphthyl)(triphenyl)silane (11.23 mmol) and 2.20 g of N-Bromosuccinimide (NBS) (12.36 mmol) under argon followed by addition of 10 mL of dimethylformamide (DMF). The resultant mixture was stirred overnight at room temperature, then diluted with 500 mL of water and extracted with 3 times 50 mL of $CH_2Cl_2$. The combined organic extracts were washed with 200 mL of water, brine and dried over $Na_2SO_4$. The product was purified by passing through short column (silica) using a mixture heptane:EtOAc in a ratio of 15:1 as eluent to afford 5.28 g of product as off-white solid (10.66 mmol) with a yield of 96%.

The NMR spectrum was as follows: $^1H$ NMR (200 MHz, $CDCl_3$, 25° C.): δ 8.29 (d, J=8.4 Hz, 1H), 7.80 (s, 1H), 7.66 (m, 8H), 7.52-7.27 (m, 10H), 3.18 (s, 3H, $OCH_3$).

Anal. calcd. for $C_{29}H_{23}BrOSi$: C, 70.30; H, 4.68. Found: C, 68.99; H, 4.56.

C. One pot synthesis of {ONO}B(OH)

This is a one pot method comprises the following steps:
(i) To a solution of 1.44 g of (4-bromo-3-methoxy-2-naphthyl)(triphenyl)silane (2.91 mmol) in 20 mL of THF were added 3.7 mL of iPrMgCl.LiCl 0.82 M in THF (3.06 mmol). The reaction mixture was stirred at a temperature of 60° C. for a period of time of 2 h. All the volatiles were then removed under vacuum.
(ii) 0.419 of anhydrous $ZnCl_2$ 3.01 mmol) were added in the glovebox, 30 mL THF were vacuum transferred, and the resultant solution was stirred for 30 min at room temperature.
(iii) The solution was transferred to a Teflon-valved Schlenk followed by addition of 0.053 g of $Pd_2 dba_3$ 57.9 µmol), 0.095 g of S-Phos (231.4 µmol) and 0.34 g of 2,6-dibromopyridine (1.45 mmol). The reaction mixture was stirred for 30 h at a temperature of 105° C., cooled, diluted with 200 mL of water and extracted with 3 times 20 mL of $CH_2Cl$. The combined organic extracts were dried over $MgSO_4$, and evaporated. The crude material was composed of about 80% of product 2,6-bis[2-methoxy-3-(triphenylsilyl)-1-naphthyl]pyridine as judged by $^1H$ NMR spectroscopy.
(iv) Crude material was redissolved in 40 mL of dry $CH_2Cl_2$ under argon and treated with 4.36 mL of $BBr_3$ 1.0 M in $CH_2Cl_2$ (4.36 mmol) at a temperature of −30° C. The resultant solution was stirred overnight at room temperature cooled to 0° C. and then quenched with 50 mL of water. The organic layer was separated, dried over $Na_2SO_4$. Solvent was removed in vacuum and the residue was purified by column chromatography (silica, heptane:$CH_2Cl_2$ (1:1), $R_f$=0.12) to give 0.57 g of {ONO}B(OH) as pale-yellow microcrystalline material (0.63 mmol) with a yield of 43%.

NMR results were as follows:
$^1H$ NMR (500 MHz, $CD_2Cl_2$, 25° C.): δ (signal from OH was not assigned) 8.29 (d, J=8.5 Hz, 2H), 8.10 (d, J=7.9 Hz, 2H), 8.02 (t, J=7.9 Hz, 1H), 7.78 (s, 2H), 7.60 (d, J=7.9 Hz, 2H), 7.54 (t. J=8.0 Hz, 2H), 7.48 (d, J=7.2 Hz, 12H), 7.32 (t, J=7.9 Hz, 2H), 7.27 (t, J=7.2 Hz, 6H), 7.14 (t. J=7.2 Hz, 12H).
$^{13}C$ NMR (125 MHz, $CD_2Cl_2$, 25° C.): δ 139.3, 136.7, 136.5, 136.3, 134.6, 132.1, 129.7, 129.3, 129.1, 129.1, 128.3, 127.6, 126.7, 123.6, 122.9, 122.4, 111.9.

MS-FAB (m/z): 905.3 ($M^+$).

Anal. calcd. for $C_{61}H_{44}BNO_3Si_2$: C, 80.87; H, 4.90. Found: C, 80.17; H, 4.34.

Figure 1:
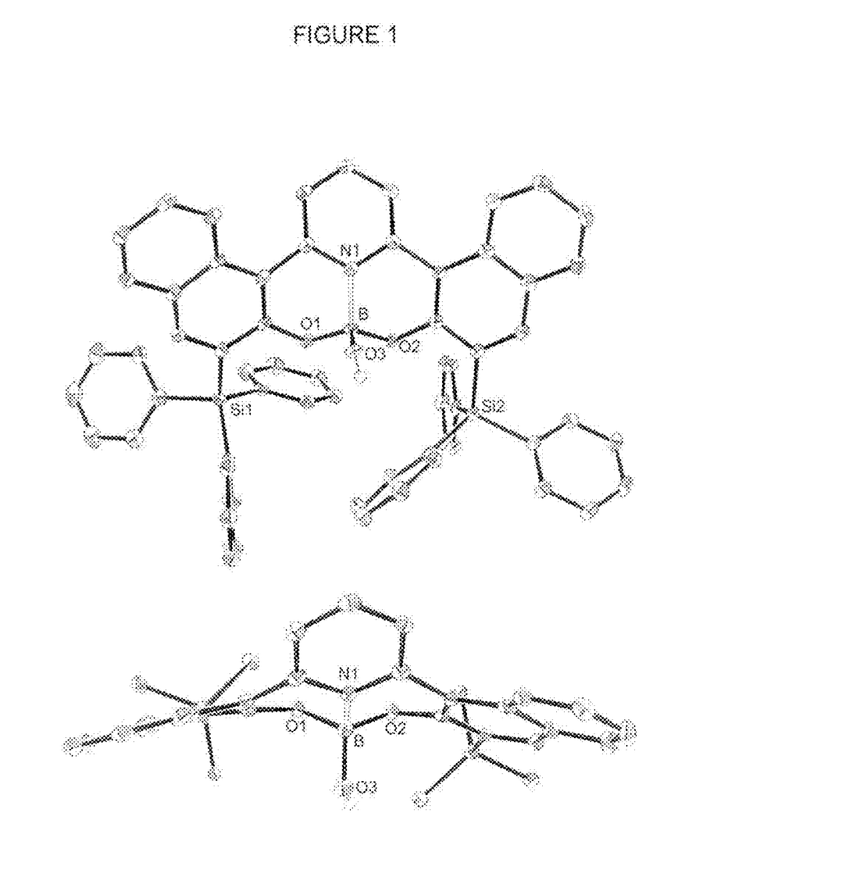
FIG. 1 represents the molecular structure of {ONO}B(OH) product.

The molecular structure of this ligand can be seen in FIG. 1.

Synthesis of meso-{ONO}La[N(SiHMe$_2$)$_2$](THF)

A Schlenk tube was charged with 0.10 g of {ONO}$H_2$ (0.11 mmol) and 0.077 g of La[N(SiHMe$_2$)$_2$]$_3$(THF)$_2$ (0.11 mmol), and 5 mL of benzene were vacuum transferred. The reaction mixture was stirred overnight at room temperature, filtered, evaporated and dried in vacuum to give 0.13 g of lanthanum complex as pale-yellow microcrystalline material (0.11 mmol) with a yield of 91%.

Figure 2:
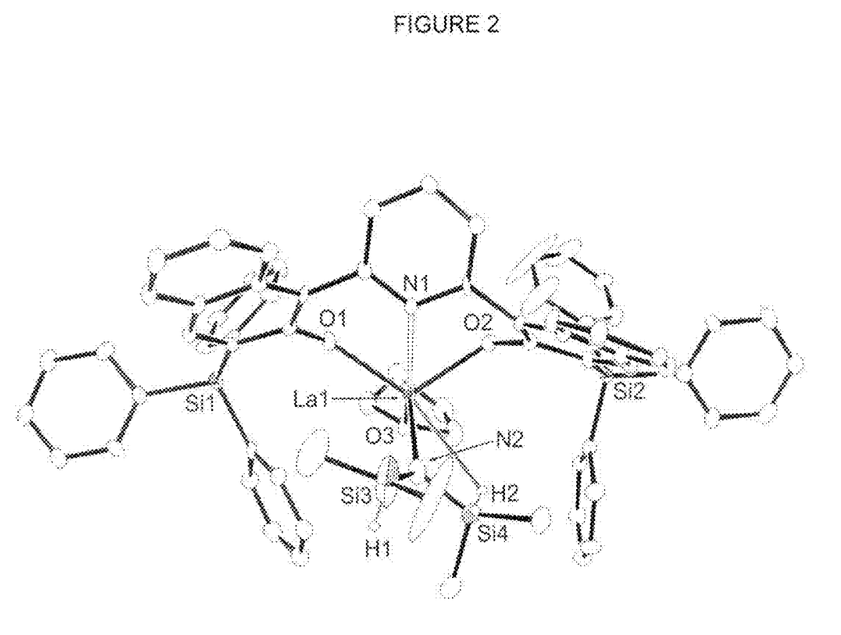
FIG. 2 represents the molecular structure of lanthanum metallic complex mesa-{ONO}La[N(SiHMe$_2$)$_2$](THF).

The molecular structure of the lanthanum complex is represented in FIG. 2.

The NMR spectra were as follows:
$^1H$ NMR (500 MHz, benzene-$d_6$, 25° C.): δ 8.24 (s, 2H), 8.03-7.94 (m, 14H), 7.50 (d, J=7.7 Hz, 2H), 7.39 (m, 2H), 7.31 (d, J=7.7 Hz, 2H), 7.29-7.19 (m, 18H), 7.17 (m, 2H), 6.98 (t, J=7.7 Hz, 1H), 4.29 (sept, $^3$J=2.8 Hz, 2H, SiHMe), 3.07 (br m, 4H, α-$CH_2$, THF), 1.07 (br m, 4H, β-$CH_2$, THF), −0.11 (d, $^3$J=2.8 Hz, 12H, SiHMe).

$^{13}$C NMR (125 MHz, benzene-d$_6$, 25° C.): δ 162.1, 156.6, 144.3, 138.5, 137.0, 136.9, 132.6, 129.3, 129.2, 128.3, 128.0, 127.9, 127.8, 127.3, 123.8, 121.9, 118.3, 68.3, 24.9, −2.5.

Figure 3:
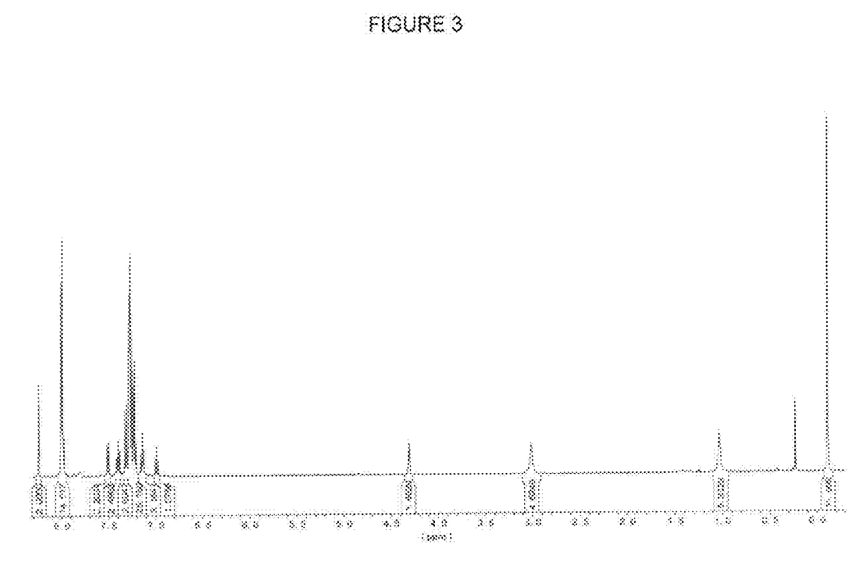
FIG. 3 represents the $^1$H NMR spectrum of meso-{ONO}La[N(SiHMe$_2$)$_2$](THF).

The $^1$H NMR of the lanthanum complex is represented in FIG. 3.

Anal. calcd. for C$_{71}$H$_{69}$LaN$_2$O$_3$Si$_4$: C, 68.24; H, 5.57. Found: C, 67.23; H, 5.14.

Synthesis of meso-{OSO}La[N(SiHMe$_2$)$_2$](THF)

A Schlenk tube was charged with 0.165 g of {OSO}H$_2$ (0.18 mmol) and 0.127 g of La[N(SiHMe$_2$)$_2$]$_3$(THF)$_2$ (0.18 mmol), and 10 mL of benzene were vacuum transferred. The reaction mixture was stirred overnight at room temperature, filtered, evaporated and dried in vacuum to give 0.224 g of lanthanum complex as pale-yellow microcrystalline material (0.18 mmol) with a yield of 96%.

The polymerisation was carried out as follows:

In the glovebox a Schlenk flask was charged with a solution of organometallic initiator (7.0 mg, 5.7 µmol) in THF (0.90 mL). To this solution, rac-lactide (0.165 g, 0.57 mmol, 100 eq. vs. Ln) in THF (0.25 mL) was rapidly added. The reaction mixture was stirred at 20° C. for 40 min. After a small portion of the reaction mixture was removed with pipette for determining the conversion by $^1$H NMR spectrometry, the reaction was quenched by adding 1.0 mL of acidic methanol (1.2M HCl solution in CH$_3$OH) and the polymer was precipitated with excess methanol (ca 3 mL). Then, the supernatant solution was removed with pipette and the polymer was dried under vacuum to constant weight.

Figure 6:
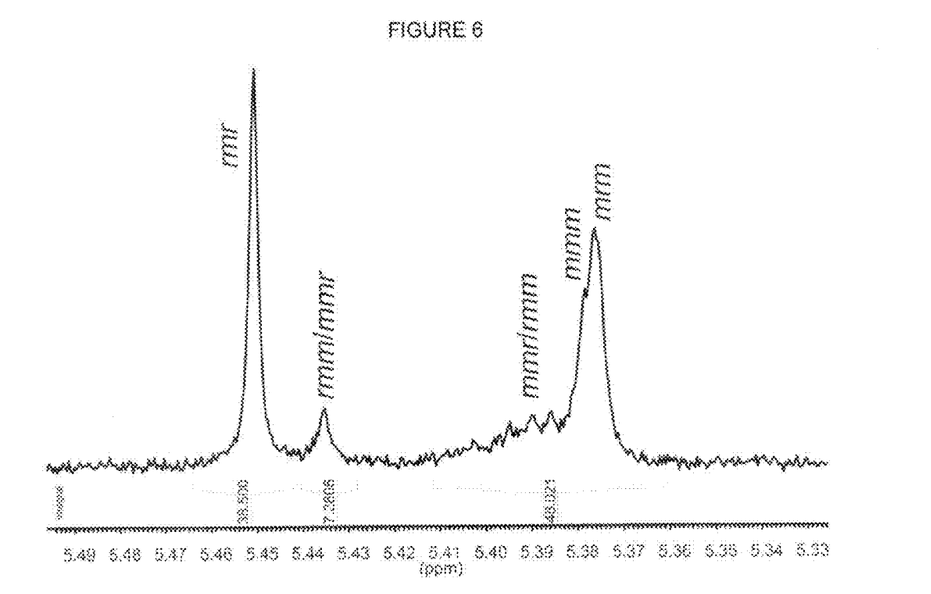
FIG. 6 represents the $^1$H NMR spectrum of heterotactic-rich PLA (rmr+mrm=88%) obtained with precursor meso-{ONO}La[N(SiHMe$_2$)$_2$](THF).

The $^1$H NMR of the heterotactic-rich polylactide (Table I, entry 1) is represented in FIG. 6.

TABLE I[a]

| Run | Prec. | [M]/[Ln] | Time, min | Solvent | Conv. (%) | M$_{n.\,calc.}$[b] (×10$^3$) | M$_{n.\,exp.}$[c] (×10$^3$) | M$_w$/M$_n$[c] | Heterotacticity (%)[d] |
|---|---|---|---|---|---|---|---|---|---|
| 1 | P1 | 100 | 40 | THF | 87 | 12.5 | 12.7 | 1.43 | 88 |
| 2 | P1 | 100 | 60 | THF | 96 | 13.8 | 13.1 | 1.52 | — |
| 3 | P1 | 500 | 30 | THF | 25 | 18.0 | 23.1 | 1.39 | — |
| 4 | P1 | 500 | 60 | THF | 42 | 30.3 | 38.2 | 1.55 | — |
| 5 | P1 | 500 | 360 | THF | 74 | 53.3 | 49.8 | 1.90 | — |
| [e]6 | P1 | 100 | 2 | toluene | 100 | 14.4 | 17.5 | 1.68 | 63 |
| [f]7 | P1 | 500 | 30 | toluene | 85 | 12.3 | 10.4 | 1.36 | — |
| [f]8 | P1 | 500 | 60 | toluene | 94 | 13.5 | 12.7 | 1.52 | — |
| 9 | P1 | 500 | 30 | toluene | 41 | 29.5 | 34.2 | 1.51 | — |
| 10 | P1 | 500 | 60 | toluene | 88 | 63.4 | 51.1 | 1.74 | — |
| [e]11 | P2 | 100 | 700 | THF | 100 | 14.4 | 11.4 | 1.71 | 74 |
| [e]12 | P2 | 100 | 700 | toluene | 100 | 14.4 | 9.7 | 1.66 | atactic |
| [e]13 | P3 | 100 | 700 | THF | 100 | 14.4 | 11.6 | 1.51 | 75 |
| [e]14 | P3 | 100 | 700 | toluene | 100 | 14.4 | 12.2 | 1.65 | atactic |
| [e]15 | P4 | 100 | 700 | THF | 100 | 14.4 | 14.0 | 1.82 | 68 |
| [e]16 | P4 | 100 | 700 | toluene | 100 | 14.4 | 11.2 | 1.47 | atactic |

[a][rac-LA] = 1.0 mol/L, T = 20° C.
[b]Calculated M$_n$ values considering one polymer chain per metal-center.
[c]Experimental M$_n$ and M$_w$/M$_n$ values determined by GPC in THF vs. PS standards; Mn values were corrected with a Mark-Houwink factor of 0.59
[d]Percentage of the rmr + mrm tetrads as determined by homodecoupling $^1$H NMR of the methine region.
[e]Reaction time is unoptimised.
[f]The polymerisation was carried out in the presence of 5 eq. iPrOH vs. La.

Figure 4:
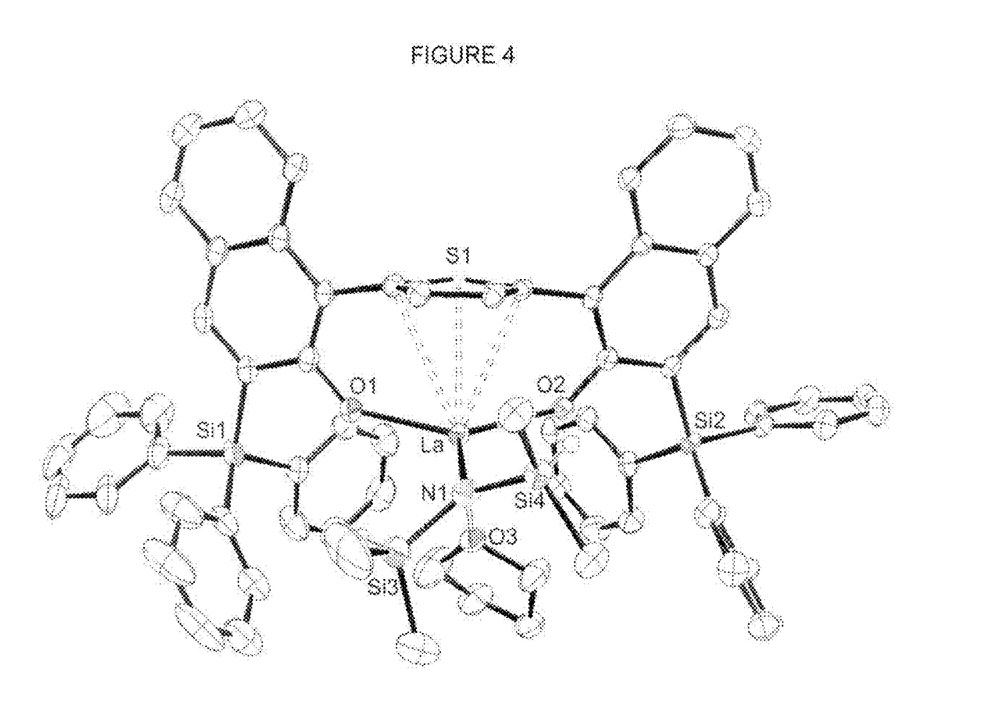
FIG. 4 represents the molecular structure of lanthanum metallic complex mesa-{OSO}La[N(SiHMe$_2$)$_2$](THF).

The molecular structure of the lanthanum complex is represented in FIG. 4.

The NMR spectra were as follows:

$^1$H NMR (500 MHz, benzene-d$_6$, 25° C.): δ 8.08 (s, 2H), 7.94 (d, J=8.3 Hz, 2H), 7.89 (m, 12H), 7.52 (s, 2H, thiophene), 7.49 (m, 2H), 7.42 (d, J=8.3 Hz, 2H), 7.33 (m, 18H), 7.13 (m, 2H), 4.55 (sept, $^3$J=2.8 Hz, 2H, SiHMe), 2.70 (br m, 4H, α-CH$_2$, THF), 0.76 (br m, 4H, β-CH$_2$, THF), 0.19 (d, $^3$J=2.8 Hz, 12H, SiHMe).

$^{13}$C NMR (125 MHz, benzene-d$_6$, 25° C.): δ 173.0, 151.8, 143.8, 136.6, 136.5, 136.1, 132.0, 129.1, 129.0, 128.1, 127.9, 126.9, 126.6, 122.7, 121.5, 111.6, 69.1, 24.5, 3.1.

Figure 5:
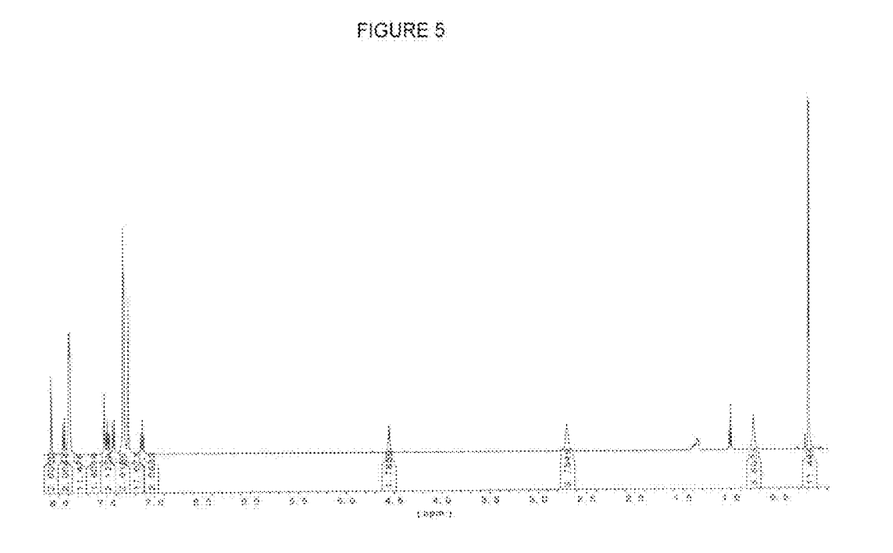
FIG. 5 represents the $^1$H NMR spectrum of meso-{OSO}La[N(SiHMe$_2$)$_2$](THF).

The $^1$H NMR of the lanthanum complex is represented in FIG. 5.

Anal. calcd. for C$_{70}$H$_{68}$LaNO$_3$SSi$_4$: C, 67.01; H, 5.46. Found: C, 66.78; H, 5.57.

ROP of racemic-lactide.
Precursor P1 is meso-{ONO}La[N(SiHMe$_2$)$_2$](THF)
Precursor P2 was in situ generated from {ONO}H$_2$ and Y[N(SiHMe$_2$)$_2$]$_3$(THF)$_2$
Precursor P3 is meso-{OSO}La[N(SiHMe$_2$)$_2$](THF)
Precursor P4 was in situ generated from {OSO}H$_2$ and Y[N(SiHMe$_2$)$_2$]$_3$(THF)$_2$ ROP of rac-β-butyrolactone.
Precursor P1 is meso-{ONO}La[N(SiHMe$_2$)$_2$](THF)
Precursor P2 was in situ generated from {ONO}H$_2$ and Y[N(SiHMe$_2$)$_2$]$_3$(THF)$_2$
Precursor P3 is meso-{OSO}La[N(SiHMe$_2$)$_2$](THF)
Precursor P4 was in situ generated from {OSO}H$_2$ and Y[N(SiHMe$_2$)$_2$]$_3$(THF)$_2$ The polymerisation was carried out as follows:

In the glovebox, a Schlenk flask was charged with a solution of organometallic initiator (7.0 mg. 9.9 µmol) in THF (0.19 mL). To this solution, rac-β-butyrolactone (BBL) (49.3 mg, 0.57 mmol, 100 eq. vs. Ln) was rapidly added. The reaction mixture was stirred at 20° C. for 100 min. After an aliquot of the reaction mixture was removed with pipette for determining the conversion by $^1$H NMR spectrometry, the reaction mixture was quenched by adding 1 mL of acidic methanol (1.2M HCl solution in CH$_3$OH). The polymer was precipitated with excess methanol (2 mL), then the supernatant solution was removed with pipette and the polymer was dried under vacuum to constant weight.

Figure 7:
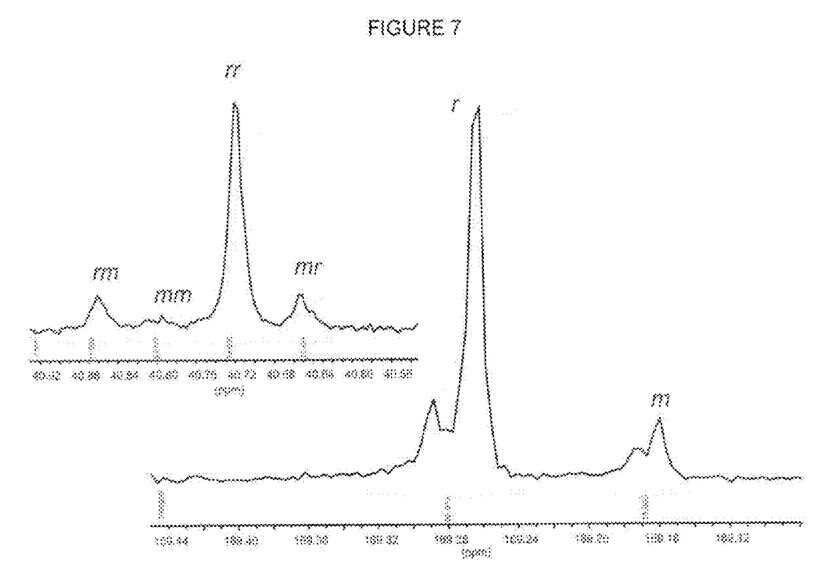
FIG. 7 represents the $^{13}$C NMR spectrum of syndiotactic-rich PHB (rmr+mrm=86%) obtained with precursor meso-{ONO}La[N(SiHMe$_2$)$_2$](THF).

The $^{13}$C NMR of the syndiotactic-rich PHB (Table II, entry 2) is represented in FIG. 7.

TABLE II[a]

| Run | Prec. | [BBL]/[Ln] | Time, min | Solvent | Conv. (%) | $M_{n.\ calc.}$[b] (×10³) | $M_{n.\ exp.}$[c] (×10³) | $M_w/M_n$[c] | $P_r$[d] |
|---|---|---|---|---|---|---|---|---|---|
| 1 | P1 | 100 | 100 | THF | 80 | 6.9 | 7.7 | 1.25 | 0.53 |
| 2 | P1 | 100 | 2 | toluene | 24 | 2.1 | 1.8 | 1.12 | 0.86 |
| 3 | P1 | 100 | 15 | toluene | 62 | 5.3 | 4.8 | 1.38 | — |
| 4 | P2 | 300 | 700 | THF | 30 | 7.7 | 12.7 | 1.41 | 0.53 |
| 5 | P2 | 300 | 700 | toluene | 70 | 18.1 | 14.02 | 1.29 | 0.78 |
| 6 | P3 | 300 | 360 | THF | 82 | 21.2 | nd | nd | — |
| 7[e] | P3 | 300 | 1000 | THF | 100 | 25.8 | 16.2 | 1.35 | 0.46 |
| 8 | P3 | 300 | 360 | toluene | 92 | 23.7 | 12.8 | 1.38 | 0.55 |
| 9 | P4 | 300 | 1000 | THF | 20 | 5.2 | 9.8 | 1.35 | 0.52 |
| 10 | P4 | 300 | 1000 | toluene | 30 | 7.7 | 7.6 | 1.22 | 0.67 |

[a][rac-BBL] = 3.0 mol/L, T = 20° C.
[b]Calculated $M_n$ values considering one polymer chain per metal-center.
[c]Experimental $M_n$ and $M_w/M_n$ values determined by GPC in THF vs. PS standards. $M_n$ values were corrected with a Mark-Houwink factor of 0.68.
[d]$P_r$ is the probability of racemic linkage of a new incoming monomer unit in the growing polyester chain and was determined by ¹³C NMR spectroscopy.
[e]Reaction time was not optimised.

The invention claimed is:

1. A process for preparing homo-or co-polymers of polar cyclic monomers by ring-opening polymerisation with a metallic complex of formula I:

(I)

wherein $R^1$, $R^3$, $R^4$, $R^5$, $R^6$ and $R^7$ are each independently selected from hydrogen, an unsubstituted or a substituted hydrocarbyl, or an inert functional group, wherein two or more of $R^1$, $R^3$, $R^4$, $R^5$, $R^6$ and $R^7$ can be linked together to form one or more rings;
wherein Z' is one or two heteroatom(s) and n is 0 or 1;
wherein Z is an atom selected from Group 14 of the Periodic Table;
wherein $R^2$ is an alkyl or a substituted or an unsubstituted aryl group having at most 8 carbon atoms with the restriction that $Z(R^2)_3$ is a bulky group that is at least as bulky as tert-butyl, and wherein $Z(R^2)_3$ can be a substituted aryl group;
wherein M is a metal of Group 3 of the periodic Table or a member of the lanthanide series; and
wherein $R^\$$ is an alkyl, $CH_2SiMe_3$, $CH(SiMe_3)_2$, OR*, or $NR^{**}_2$, wherein $R^*$ is alkyl, aryl or lactate O-CH(CH₃)(COOR'), and wherein $R^{**}$ is $SiMe_3$ or $SiHMe_2$.

2. The process of claim 1, wherein $R^1$, $R^3$, $R^4$, $R^5$, $R^6$ and $R^7$ are each independently selected from hydrogen or alkyl groups having at most 6 carbon atoms.

3. The process of claim 1, wherein Z' is S or N.

4. The process of claim 1, wherein Z is C or Si.

5. The process of claim 1, wherein $R^2$ is a substituted or an unsubstituted phenyl group or a higher aromatic group.

6. The process of claim 1, wherein $R^5$ is $N(SiHMe_2)_2$, $N(SiMe_3)_2$ or OiPr.

7. The process of claim 1, wherein the polar cyclic monomers are selected from lactides, beta-butyrolactone, or 5- or 6- membered cyclic carbonates selected from trimethylenecarbonate (TMC), 2-benzyloxy-trimethylenecarbonate (BTMC), 2-hydroxy-trimethylenecarbonate (TMCOH), 4-(benzyloxymethyl)-1,3-dioxolan-2-one (BDMC), 4-(hydroxymethyl)-1,3-dioxolan-2-one (DMCOH), 2-oxy-trimethylenecarbonate (OTMC), dehydrotrimethylenecarbonate (DHTMC), or a combination thereof.

* * * * *